United States Patent [19]
Gold et al.

[11] Patent Number: 4,465,093
[45] Date of Patent: Aug. 14, 1984

[54] HYDRAULIC FUSE VALVE

[76] Inventors: Harold Gold, 3645 Tolland Rd., Shaker Heights, Ohio 44122; Tadeusz Budzich, 80 Murwood Dr., Moreland Hills, Ohio 44022

[21] Appl. No.: 414,829

[22] Filed: Sep. 3, 1982

Related U.S. Application Data

[63] Continuation-in-part of Ser. No. 285,596, Jul. 21, 1981.

[51] Int. Cl.³ .............................................. F16K 17/30
[52] U.S. Cl. ................................... 137/498; 137/462; 137/512.2; 137/599.2
[58] Field of Search ............... 137/460, 462, 498, 517, 137/512.2, 599.2, 504

[56] References Cited

U.S. PATENT DOCUMENTS

| | | |
|---|---|---|
| 484,526 | 10/1892 | Valentine . |
| 547,506 | 10/1895 | Sleigh et al. . |
| 1,258,114 | 3/1918 | Hayward . |
| 2,925,826 | 2/1960 | Streeter . |
| 2,929,403 | 3/1960 | Streeter . |
| 3,085,589 | 4/1963 | Sands ................................. 137/498 |
| 3,661,175 | 5/1972 | Tillman .......................... 137/498 X |
| 3,677,605 | 7/1972 | Matsumoto .................. 137/512.2 X |
| 3,735,777 | 5/1973 | Katzer et al. . |

FOREIGN PATENT DOCUMENTS

2324710 12/1974 Fed. Rep. of Germany ...... 137/460

Primary Examiner—Robert G. Nilson
Attorney, Agent, or Firm—Yount & Tarolli

[57] ABSTRACT

A fluid fuse operable to shut off fluid flow upon rupture of fluid conducting line downstream of the fuse. The fuse is actuated by two forces generated by pressure differential caused by sudden decompression of the fluid and developed across two variable, sharp edge, viscosity insensitive orifices, positioned in series and separated by a flow cut-off and sealing surface. The closing force, generated by the pressure differential of the upstream orifice is dominant and increases with the displacement of the closing member in a predetermined manner, permitting the use of a high preload and high rate opposing spring, at relatively low pressure differentials. The sealing surface of the fuse is provided with limited freedom of alignment to permit tight sealing. The fuse assembly includes a manually adjustable bypass arrangement and a pressure peak attenuating control.

48 Claims, 10 Drawing Figures

HYDRAULIC FUSE VALVE

This is a continuation in part of application Ser. No. 06/285,596, filed July 21, 1981 for "Hydraulic Fuse Valve".

BACKGROUND OF THE INVENTION

This invention relates to hydraulic fuses of the type that pass a system's maximum flow with acceptable pressure loss and which triggers to fully closed position in response to the short interval of liquid decompression flow that accompanies the fused line rupture. To obtain this performance, the lowering of the trigger flow due to the variation of liquid viscosity, or due to external effects such as shock and vibration must not reduce the trigger flow to or below the system maximum flow. The allowable lowering of the trigger flow is dependent on the difference between the mean value of the trigger flow and the system maximum flow. By way of example, if the mean value of the trigger flow is 20 percent above the system maximum flow, the deviation of trigger flow from the mean must be less than 20 percent of the system maximum flow. It is therefore of advantage to utilize a high difference between the mean trigger flow and the system maximum flow and to minimize the effects of viscosity, shock and vibration.

In the related prior art, Jackson U.S. Pat. No. 3,741,241 employs a shutoff device that is biased open by a spring and is driven closed by the pressure drop across the closure device and, Tilman U.S. Pat. No. 3,476,141 and Waterman U.S. Pat. No. 2,821,209 employ a fixed orifice in series with the shut-off device. In both Tilman and Waterman the pressure drop across the fixed orifice produces principally the same force as does the pressure drop across the shut-off device and accordingly, these fuses would be viscosity sensitive even if the fixed orifice were made viscosity insensitive. The viscosity variation encountered in normal liquid service could cause the shut-off flow of these fuses to vary by a factor of greater than 100. In the fuse shown in our copending application Ser. No. 265,596 an upstream, viscosity insensitive orifice is in series with a shut-off device and a second variable but viscosity sensitive orifice. The pressure drop across the second orifice produces a substantially less force than does the pressure drop across the upstream orifice. The effect of the second orifice is further reduced by the large open-state area of the second orifice. The penalty paid for the large area of the second orifice is the required stroke of the moving element. The long stroke contributes significantly to the maximum spring load and thereby limits the bias load that can be used and accordingly, the margin between trigger flow and system maximum flow. The viscosity sensitivity of the second orifice limits the application of the fuse to the lower range of viscosities encountered in current systems.

In the copending application the reduction of area of the orifices with travel causes the fuse to trigger, or to completely close once the shut-off flow is reached. With the fixed series orifice shown in Tilman and Waterman the fuse will close gradually as the flow approaches the shut-off value and trigger-like action does not take place until an uncertain position of the shut-off device is reached. Full triggering gives definition and certainty to the closure point and thereby, improved accuracy of shut-off flow over that provided by Tilman, Waterman or the like.

SUMMARY OF THE INVENTION

It is therefore a principle object of the invention to provide a fuse valve with trigger flow setting well above the maximum flow output of the system in which it is used and, which is capable of being actuated by the decompression flow of the pressurized liquid upstream of the fuse valve.

Another object of this invention is to provide a fuse valve which is viscosity insensitive, with minimum variations in trigger flow level over a wide viscosity range.

It is another object of this invention to provide a fuse valve which is highly insensitive to external shock along the axis of closure and in the direction of fluid flow.

It is another objective of this invention to provide a fuse valve which can accomodate a biasing spring of high preload and rate, while the pressure differential across the variable orifice is relative low at the triggering flow level.

It is another object of this invention to provide a fuse valve generating high closure actuating force at low pressure differential, the rate of change of this force, in respect to the stroke of the closure, being dictated by the rate of convergence of the converging surfaces and resulting in controlled acceleration of the closure.

It is another object of this invention to provide a fuse valve in which the closure is subjected to high decelerating force just before the point of closing.

It is another object of this invention to provide a fuse valve in which the closure is guided by a single, low length to diameter ratio bearing while being accelerated.

It is another object of this invention to provide a fuse valve in which the closure is provided with a limited freedom alignment at seating.

It is another object of this invention to provide a fuse valve with an externally adjustable bypass.

It is another object of this invention to provide a fuse valve assembly with internal pressure peak limiting control.

Briefly, the foregoing and other objectives and advantages of this invention are accomplished by providing a novel fuse valve for use in hydraulic systems without engergy storage devices, which is triggered to full closure by the short interval of liquid decompression flow and, where the trigger flow value is substantially above the system maximum flow. The fuse valve is provided with two sharp edge discs, separated by a conical sealing surface, which forms two annular, viscosity-insensitive orifices in series, in respect to converging surfaces of revolution of the fuse valve bore. The high controlled acceleration of the conical sealing surface past its trigger point, obtained through the converging surfaces, results in extremely short closing time, with minimum volume of liquid passed downstream of the fuse valve during the closing period. Controlled deceleration of the conical sealing surface is provided just prior to seating of the surface. A conical sealing surface aligning guide is included which allows liquid pressure to seat the conical surface on a circular edge with full circular contact. The fuse valve is also provided with an adjustable bypass and with internal pressure peak limiting control.

Additional objects of this invention will become apparent when referring to the preferred embodiments of the invention as shown in the accompanying drawings and described in the following detailed description.

DESCRIPTION OF THE DRAWINGS

and.

DETAILED DESCRIPTION OF THE INVENTION

Figure 1:
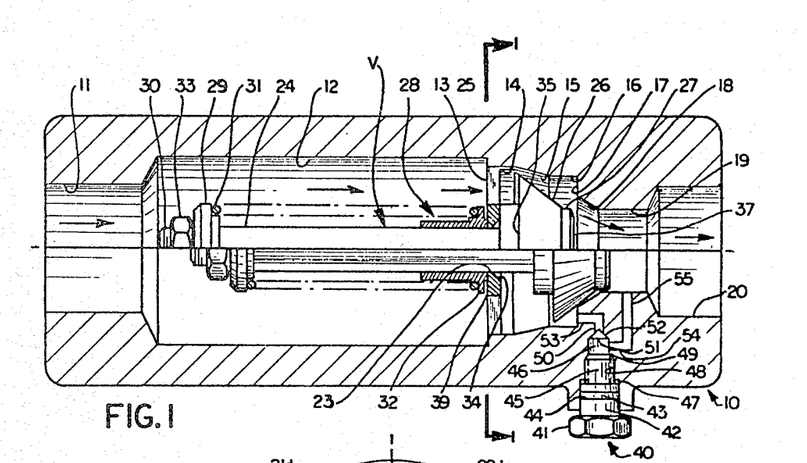
FIG. 1 is a longitudinal section through a fluid fuse embodying the features of this invention and showing the open and closed positions of the moving element.
Figure 2:
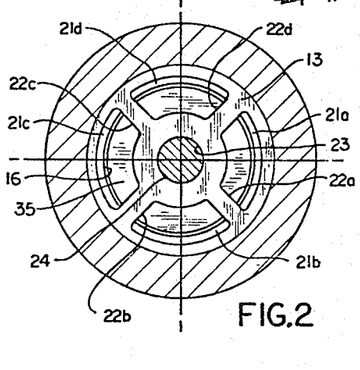
FIG. 2 is a sectional view taken in the plane 1—1 of FIG. 1.
Figure 3:
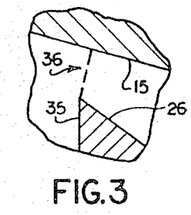
FIG. 3 is an enlarged fragmentary longitudinal section in the plane of FIG. 1, illustrating the geometrically defined flow area of the fuse upstream orifice; p

In FIG. 1 a schematically represented housing 10 provides contiguously: inlet bore 11, transmission bore 12, slotted wall 13, spacing bore 14, conical bore 15, inter-orifice bore 16, wall 17, conical bore 18, outlet bore 19 and discharge bore 20. As shown in FIG. 2, slotted wall 13 has segmented openings 21a–21d that are formed between arms 22a–22d which support guide bearing 23. Fuse shaft 24 mates with running clearance in guide bearing 23 and is structurally integral with cylindrical collar 25, shut-off cone 26 and lead cylinder 27. Shaft 24 extends upstream through spring sleeve 28 and spring cap 29 and terminates at threaded cylinder 30. Spring 31 is held coaxial with shaft 24 by flange 32 of sleeve 28 and cap 29 and is retained by nut 33 which engages cylinder 30. Bearing bore 23 is made shorter than the thickness of wall 13 by conical relief 34. Shaft collar 25 is joined to wall 35 which forms the base of cone 26. The circular intersection of wall 35 and cone 26 geometrically combines with conical bore 15, as illustrated in FIG. 3, to form orifice 36. The flow area of orifice 36 is the area of a conical surface that is perpendicular to bore 15 and extends from bore 15 to the circular edge defined by the intersection of cone 26 and wall 13. The dashed line represents a line element of the area defining conical surface. In the same manner and illustrated in FIG. 4, the area of orifice 38 is the area of a conical surface that is perpendicular to bore 18 and extends from bore 18 to the circular intersection of cylinder 27 and conical bevel 37. The dashed line represents a line element of the area defining conical surface. The orifice areas so defined are the minimum flow areas between the circular edges and the conical bores.

In the open state of the fuse illustrated in the upper half of FIG. 1 flow passes freely, as indicated by the arrows, through bores 11 and 12, through openings 21a–21d in wall 13 and through spacing bore 14 to orifice 36. The flow resistance presented by orifice 36 causes the fluid pressure to be reduced as he flow passes into bore 16. The surfaces of cone 26 and bore 15 provide a passage of uniform expansion from orifice 36 into bore 16. Thus in the open state an essentially loss free passage from orifice 36 to orifice 38 is provided. The flow resistance presented by orifice 38 causes the fluid pressure to reduce as flow passes into bore 19. The circular edge formed by the intersection of wall 35 and cone 26 and the circular edge formed by the intersection of cylinder 27 and cone 37 are made relatively sharp, and thereby the orifices 36 and 38 are viscosity insensitive. It then follows that the viscosity insensitivity of the trigger flow rate is independent of the open state ratio of the area of orifice 38 to that of orifice 36. It can be shown mathematically that the pressure drop across orifice 36 acts on an area equal to that of the full base of cone 26 and the pressure drop across orifice 38 acts on an area equal to that of the end face of cylinder 27. The closing force is the sum of the forces produced by the pressure drops across orifice 36 and orifice 38. The bias force that must be provided by spring 31 is equal to the sum of the forces produced by the two orifice pressure drops at the trigger flow rate. As illustrated in FIG. 1, the area of the base of cone 26 is substantially larger than the area of the end face of cylinder 27 and, therefore; the pressure drop across orifice 36 provides the dominant contribution to the bias load. Furthermore, the large area of the base of cone 26 permits high bias loads with relatively low pressure drop.

The maximum load on spring 31 is the bias force plus the compression load. The compression load is the product of the stroke of shaft 24 from the open position to the closed and the rate of spring 31. The stroke can be shortened by moving wall 17 and conical bore 18 toward cone 26 but, this change would simultaneously decrease the area of orifice 38 and result in an increase in the bias force. For a given set of conditions this counteracting effect can result in either a decrease or an increase in maximum spring load. It can be shown mathematically that for a given spring rate and set of geometric conditions an open-position area of orifice 38 exists with which the contribution of orifice 38 to the maximum spring load is a minimum. The bias force that results from this orifice size produces the highest possible trigger flow rate and the maximum trigger shock resistance at maximum system flow rate that is obtainable with the set of geometric conditions.

It is characteristic of springs that high loads require high spring rates. This characteristic makes it extremely difficult to employ high bias loads in the non-triggering fuses of the prior art. The trigger action, described in our copending application and herein applied, through its negative spring rate effect, makes high spring bias loads physically realizable in fluid fuses. It is only necessary that the bias spring rate be less than the hydraulic, negative spring-rate. Our application studies show that the negative spring rate is characteristicly and substantially higher than present metalurgy permits in applicable wire springs. The high bias spring force provides high resistance to axial shock in the closing direction and, the high spring rate prevents resonant oscillation in the frequency band occurring in normal practice.

Figure 5A:
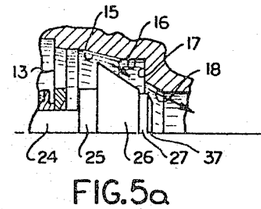
FIG. 5a–5c are fragmentary longitudinal sections in the plane of FIG. 1 and showing three positions of the moving element between the full open and full closed positions shown in FIG. 1.
Figure 5B:
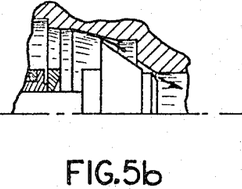
Figure 5C:
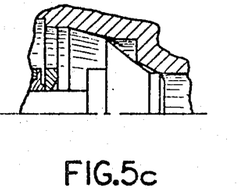

It can be seen from FIG. 1. that in the open state the spring force clamps the base of sleeve 28 and collar 25 to opposite sides of wall 13. This clamping action holds shaft 24 perpendicular to wall 13 and simultaneously bore 23 holds it concentric with the downstream bores. When the trigger flow rate is reached collar 25 moves away from wall 13. In this state the shaft is free to move angularly with respect to the axis of bore 23. The motion is permitted by the clearance with bore 23 and the shortness of it. The sleeve flange 37 is back relieved to a small diameter as shown at 39. This relief reduces the resistance of the sleeve to angular deflection of the shaft. During the closure transient the symmetry of the cone and of the bores precludes the occurence of side forces sufficient to overcome the angular resistance of sleeve 28. The side forces that can occur at seating easily overcome this resistance. The cone angle of cone 26 is greater than the cone angle of bore 18. For this reason cone 26 seats on the circular intersection of wall 17 and cone 18. If due to the running clearance between shaft 24 and bore 23 or to a small eccentricity of bore 23 with respect to the downstream bores, bevel 37 of cylinder 27 strikes the wall of conical bore 18, the shaft angular freedom will permit cylinder 27 to slide into bore 19. The illustration of FIGS. 1 and 5c show that just prior to seating and after, shaft 24 is held in axial alignment by its engagement with the two axially spaced bores 23 and 19. The shaft clearance with the bores and the short axial engagement permits lateral and angular movement of cone 26 through the pressure forces to urge cone 26 into full circular seating position.

The fuse triggers because the rate of increase of hydraulic closing force due to reduction of orifice areas with closing direction travel is greater than the increase of spring force with that travel. This trigger action produces acceleration only and could result in destructive impact at shut-off. The manner in which the fuse of this invention provides deceleration to prevent destructive impact at shut-off will be described with reference to FIGS. 5a–5c. In FIG. 5a the cone and cylinder, assembly is at approximately half stroke. At this point in the triggering action the accleration has produced a high velocity. The flow components in the chamber defined between orifice 36 and orifice 38 are: the flow entering through orifice 36, the flow pumped in by cone 26 and the flow leaving through orifice 38. Because orifices 36 and 37 are still relatively large the flow out of orifce 38 is the sum of the flow in through orifice 36 and the flow pumped by cone 26. This flow distribution causes the pressure between the two orifices to rise. The rise in pressure reduces the in-flow from orifice 36 and increases the out-flow through orifice 38 and, the rise in pressure reduces the acceleration. In the position shown in FIG. 5b orifice 38 has reduced to nearly its clearance area while the area of orifice 36 is well above its clearance area. In this case the high resistance of orifice 38 causes the flow pumped by cone 26 to pass out of orifice 36. This flow reversal causes the pressure between the orifices to be greater than the pressure upstream of orifice 36 and deceleration occurs. In the position shown in FIG. 5c the fuse is very close to shutoff. The resistance of orifice 38 is much higher than that of orifice 36 because both its clearance and its diameter are substantially smaller. No significant flow passes out of orifice 38 and substantially all of the flow pumped by cone 26 passes backward through orifice 36. The pressure acting on cone 26 is much higher than the pressure upstream of orifice 36 and a very high deceleration occurs. At closure shown in the lower half of FIG. 1 the velocity of impact is a small fraction of the peak velocity reached in the closure transient. It should be obvious to those skilled in the art that the degree of snubbing action can be varied by variation of the length of travel in the zone of minimum area of orifices 36 and 38. It can further be observed from FIGS. 5a–5c that during the period of motion of shaft 24 it is radially restrained by bore 23 alone. Thus, small misalignment cannot cause shaft 24 to bind.

With reference to FIG. 1 manual bypass control screw 40 has a hexagonal head 41, O ring cylinder 42 having groove 43 and O ring 44 therein. Integral screw 45 and coned pintle 46 extend coaxially from cylinder 45. Cylinder 42 and screw 45 mate with bores 47 and 48 respectively in housing 10. Pintle chamber 49 in housing 10 joins coaxial passage 50 through conical transition 51. Cone 52 of pintle 46 mates with the conical transition 51. Passage 50 communicates with bore 16 through passage 53. Pintle chamber 49 communicates with bore 19 through passages 54 and 55. If a shut-off has occurred and the line has been replaced or repared but, trapped pressure holds cone 26 in the shut-off position, the fuse can be reset to the open state by backing cone 52 from its seat. Flow will then pss through the clearance between cone 26 and bore 16 and into the downstream line through passages 54 and 55. It should be noted that the clearance area between cone 26 and bore 16 is relatively large because of the large diameter and accordingly the flow is sufficient for the purpose. The bypass valve construction shown in FIG. 1 is merely representative. Many mechanical modifications of this bypass method are possible without departing from the intended scope of this invention.

Figures 6, 7, 8:
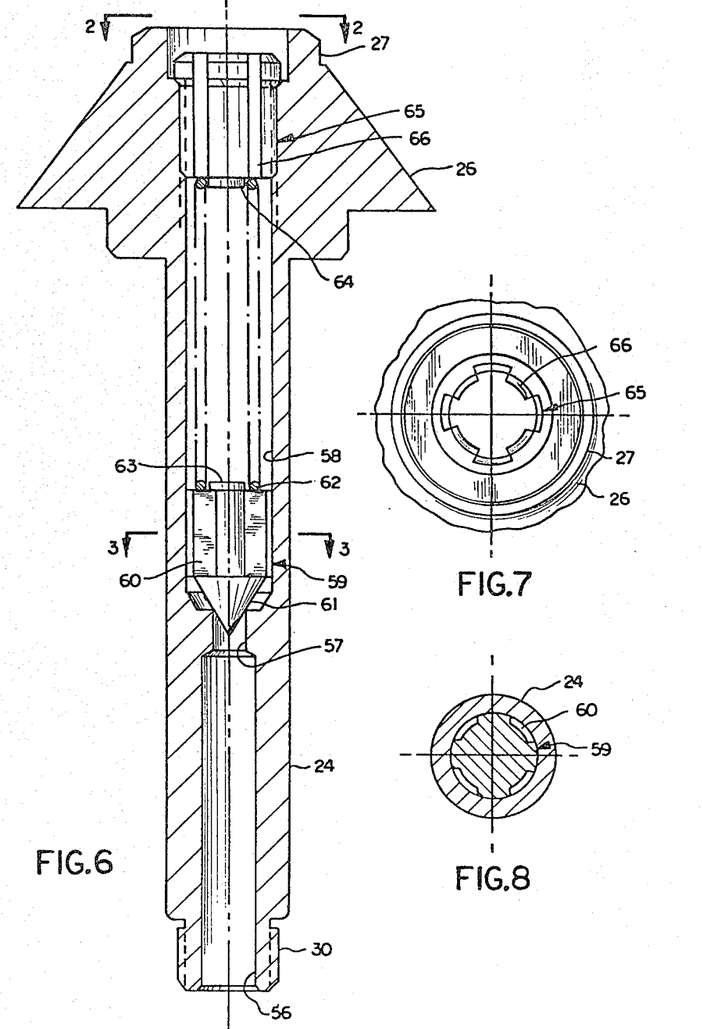
FIG. 6 is an enlarged longitudinal section through the shaft identified in FIG. 1 having an over-pressure relief valve therein.
FIG. 7 is a fragmentary view taken at plane 2—2 of FIG. 6.
FIG. 8 is a sectional view taken in the plane 3—3 of FIG. 6.

With reference to FIGS. 7–9 shaft 24 is bored to contain an over-pressure relief valve. Upstream bore 55 passes through threaded cylinder 30 and communicates with orifice 56. Valve guide bore 58 extends from the downstream end of shaft 24 to orifice 56. Valve piston 59 has flutes 60 and cone 61 and mates slideably with bore 58. Spring 62 is held coaxially by button 63 of piston 59 and, at its opposite end it is held coaxially by button 63 of retaining screw 65. Retaining screw 65 has flutes 66 and mates with threads in bore 58. When the pressure acting the area of cone 61 exposed by orifice 57 produces a force greater than the bias force of spring 62 piston 59 moves in the downstream direction, drawing cone 61 out of its sealed position in orifice 57. The flow from orifice 57 passes through flutes 60 from which it passes on the outside of spring 62 in bore 58. The discharge is made through the flutes 65 of retaining screw 65. The flow through the flutes 60 causes a further compression of spring 62 which may drive the spring to its solid height. In this construction flow paths through the coils of the spring are not utilized and for this reason the spring can close completely without consequence.

In view of the foregoing description, it is apparent that the valve assembly (FIG. 1) is operable to block fluid flows in excess of a predetermined fluid flow. The valve assembly includes a housing 10 having an inner side surface which defines a fluid flow passage through the housing. The inner side surface of the housing includes a first converging surface area 15 having a relatively large diameter inlet or upstream end and a relatively small diameter outlet or downstream end.

A second converging housing surface area 18 is part of a valve seat. The second converging surface area 18 has a relatively large diameter inlet or upstream end and a relatively small diameter outlet or downstream end. In the specific preferred embodiment of the invention illustrated in FIG. 1, the converging surface areas 15 and 18 are defined by portions of the cone, the first converging surface area 15 forming a part of the cone having a relatively small peak angle while the second surface 18 forms a part of a cone having a larger peak angle. A cylindrical connector surface 16 extends from the relatively small diameter outlet of the first converging surface 15 toward the second converging surface 18.

A valve or flow control member V is disposed in the housing 10 and is movable between an open position (shown in the upper portion of FIG. 1) and a closed position (shown in the lower portion of FIG. 1). When the flow control member V is in the closed position, it engages a portion of the valve seat to block fluid flows through the housing.

The flow control member V has a sharp edged rim portion which is formed by the intersection of side surface 35 which faces upstream and a side surface 26 which faces downstream. The side surfaces 35 and 26 on the rim of the flow control member extend transversely to the first converging surface area 15. Since the side surface area 35 extends transversely to the first converging surface area 15, the fluid flow passage through the housing contracts in a downstream direction to the variable size orifice 36 (see FIG. 3) formed between the circular sharp edge on the rim and the converging side surface area 15. Similarly, since the surface 26 extends transversely to the converging surface 15 and diverges away from the converging surface 15, the fluid flow passage through the housing expands downstream of the sharp edge at the orifice 36. This results in a pressure drop across the orifice 36 being substantially independent of fluid viscosity.

During almost the entire movement of the flow control member V from the open position to the closed position, the sharp edge formed by the intersection of the side surfaces 35 and 26 is disposed radially inwardly of the converging surface 15. This results in the size of the orifice 36 continuously decreasing during the large majority of the movement of the flow control member V from the open position to the closed position.

Figure 4:
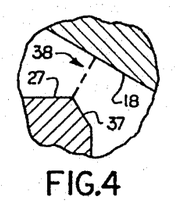
FIG. 4 is an enlarged fragmentary longitudinal section in the plain of FIG. 1, illustrating the geometrically defined flow area of the fuse downstream orifice.

The leading end portion of the flow control member V cooperates with the second converging surface area 18 to form a second variable size orifice 38 (see FIG. 4). Thus, the cylindrical radially outwardly facing side surface 27 intersects the conical side surface 37, which faces downstream, at a second sharp edge. The side surfaces 27 and 37 extend transversely to the converging surface 18 so that a fluid flow passage contracts in a downstream direction to the orifice 38 and expands in a downstream direction away from the orifice 38 (see FIG. 4). This results in the pressure drop across the orifice 38 being substantially independent of fluid viscosity.

The sharp edge at the orifice 38 is disposed radially inwardly of the converging surface 18 during the large majority of the movement of the flow control member V from the open position to the closed position. Therefore, the size of orifice 38 is continuously decreasing as the flow control member V moves from the open position to the closed position.

As the flow control member V moves from the open position to the closed position, the flow control member is accelerated to relatively high speeds. In order to minimize wear on the components of the valve assembly and to prevent impacting of the flow control member with the housing, closing movement of the flow control member is cushioned during the final portion of its movement to the closed position. Thus, as the flow control member moves to the closed position, it takes up a larger and larger percentage of the space disposed radially inwardly of the cylindrical connector surface 16. This results in an increase in the fluid pressure applied against the side surface 26 of the flow control member V with a resulting retarding of closing movement of the flow control member. The manner in which this is accomplished is shown schematically in FIGS. 5a, 5b, and 5c.

Since the flow control member V is moved quickly from the open position to the closed position, a transient pressure surge may occur in the fluid flow passage immediately downstream from the valve seat. In order to eliminate or at least modulate the effects of this pressure surge, a pressure peak limiting valve assembly 59 (see FIG. 6) is operable from a closed position (shown in FIG. 6) to an open position to connect a portion of the housing passage downstream of the valve seat in fluid communication with a portion of the housing passage upstream of the valve seat. This results in the relatively high pressure surge which tends to be generated upon closing of the valve member being dampened by communication with the relatively low fluid pressure downstream of the valve seat.

Although the preferred embodiments of this invention have been shown and described in detail it is recognized that the invention is not limited to the precise form and structure shown and various modifications and rearrangements as will occur to those skilled in the art upon full comprehension of this invention may be resorted to without departing from the scope of the invention as defined in the claims.

What is claimed is:

1. A fluid fuse valve comprising a housing having a bore provided with first and second converging surface means, fluid shut-off means slidably mounted in respect to said bore, said fluid shut-off means having first sharp edge means operable to form first variable orifice means in respect to said first converging surface means, second sharp edge means on said fluid shut-off means operable to form second variable orifice means in respect to said second converging surface means, converging shut-off means interposed between said first and said second sharp edge means, and spring biasing means operable to oppose forces developed on said fluid shut-off means be flow of fluid through said fuse valve.

2. A fuse valve as set forth in claim 1 wherein, pressure peak limiting means is interposed between upstream of said second variable orifice means and downstream of said first variable orifice means.

3. A fluid fuse valve as set forth in claim 1 wherein bypass means is operable to interconnect downstream of said first variable orifice means with upstream of said second variable orifice means.

4. A fluid fuse valve as set forth in claim 3 wherein said bypass means is operable to interconnect downstream of said first variable orifice means with upstream of said second orifice means through said second variable orifice means.

5. A fluid fuse valve as set forth in claim 1 wherein said first converging surface means includes conical, inwardly sloping surface means.

6. A fluid fuse valve as set forth in claim 1 wherein said second bore means includes conical, inwardly sloping surface means.

7. A fluid fuse valve as set forth in claim 1 wherein said shut-off means includes conical, inwardly sloping means.

8. A fluid fuse valve as set forth in claim 1 wherein said shut-off means includes pressure peak limiting means.

9. A fluid fuse valve as set forth in claim 1 wherein said shut-off means includes a stem means slidably guided in respect to said housing and pressure peak limiting means in said stem means.

10. A fluid fuse valve as set forth in claim 1 wherein said housing has bypass means operable to conduct flow across said fluid shut-off means when said fluid shut-off means interrupts fluid flow past said sharp edge means.

11. A fluid fuse valve as set forth in claim 10 wherein said bypass means has selectively engagable bypass flow interrupting means.

12. A fluid fuse valve as set forth in claim 10 wherein said bypass means has quantity of bypass flow adjusting means.

13. A fluid fuse valve as set forth in claim 1 wherein limited freedom of alignment means is interposed between said housing and said shut-off means.

14. A valve assembly operable to block fluid flows in excess of a predetermined fluid flow, said valve assembly comprising a housing for conducting fluid, said housing including an inner side surface which includes a first converging surface area, said first converging surface area having a relatively large diameter at an upstream end of said first converging surface area and a relatively small diameter at a downstream end of said first converging surface area, said housing further including a valve seat disposed downstream of said first converging surface area, said valve seat including a second converging surface area, said second converging surface area having a relatively large diameter at an upstream end of said second converging surface area and a relatively small diameter at a downstream end of said second converging surface area, a flow control member disposed in said housing and movable between an open position and a closed position in which said flow control member engages at least a portion of said valve seat to block fluid flow through said housing, said flow control member including a circular rim with first and second side surfaces which intersect to form a first sharp edge which is disposed radially inwardly of said first converging surface area during at least a major portion of the movement of said flow control member from the open position to the closed position to form a first orifice between said first converging surface area and rim, said first and second side surfaces extending transversely to said first converging surface area to form a fluid flow passage which contracts in a downstream direction to the first sharp edge and expands in a downstream direction away from the first sharp edge so that the pressure drop across said first orifice is substantially independent of fluid viscosity, said first orifice continuously decreasing in size during at least a major portion of the movement of said flow control member from the open position to the closed position, said flow control member further including a downstream end portion which cooperates with said second converging surface area to form a second orifice, said downstream end portion of said flow control member including third and fourth side surfaces which intersect to form a second sharp edge which is disposed radially inwardly of said second converging surface area during at least a major portion of the movement of said flow control member from the open position to the closed posiion, said third and fourth side surfaces extending transversely to said second converging surface area to form a fluid flow passage which contracts in a downstream direction to the second sharp edge and expands in a downstream direction away from the second sharp edge so that the pressure drop across said second orifice is substantially independent of fluid viscosity, said second orifice continuously decreasing in size during at least a major portion of the movement of said flow control member from the open position to the closed position.

15. A valve assembly as set forth in claim 14 further including spring means for applying force to said flow control member to urge said flow control member toward the open position, said flow control member being urged from the open position toward the closed position against the influence of the spring force with a fluid pressure force which is a function of the magnitude of the pressure drops across the first and second orifices during fluid flow through said housing with said flow control member in the open position.

16. A valve assembly as set forth in claim 15 wherein said second side surface engages said valve seat to block fluid flow through said housing when said flow control member is in the closed position.

17. A valve assembly as set forth in claim 14 further including pressure peak limiting means operable under the influence of a transient pressure surge upon movement of said flow control member to the closed position to connect a portion of said housing upstream of said valve seat with a portion of said housing downstream of said valve seat.

18. An apparatus as set forth in claim 14 wherein said second side surface cooperates with the inner side surface of said housing to increase the fluid pressure force applied against said second side surface immediately before said flow control member reaches the closed position during movement of said flow control member from the open position toward the closed position to thereby tend to minimize the force with which said flow control member impacts against said valve seat upon movement of said flow control member to the closed position.

19. A valve assembly as set forth in claim 14 wherein said first sharp edge is disposed adjacent to the relatively large diameter upstream end of said first converging surface area when said flow control member is in the open position and is disposed adjacent to the relatively small diameter downstream end of said first converging surface area when said flow control member is in the close position, said second sharp edge being disposed adjacent to the relatively large diameter upstream end of said second converging surface area when said flow control member is in the open position and is disposed adjacent to the relatively small diameter downstream end of said second converging surface area when said flow control member is in the closed position.

20. A valve assembly as set forth in claim 19 wherein said second side surface on said flow control member is partially disposed radially inwardly of said second converging surface area when said flow control member is in the closed position.

21. A valve assembly as set forth in claim 14 wherein said first and second side surfaces on said flow control member extend at acute angles to said first converging surface area as determined along an arc extending between a portion of said first converging surface area downstream of said first sharp edge and said first and second side surfaces.

22. A valve assembly as set forth in claim 14 wherein said inner side surface of said housing includes a connector surface area which extends downstream from the relatively small diameter end of said first converging surface area toward the relatively large diameter end of said second converging surface area, said connector surface area having an upstream end with a diameter which is equal to the diameter of the relatively small diameter end of said first converging surface area and having a downstream end with a diameter which is greater than the diameter of the relatively large diameter end of said second converging surface area, said flow control member occupying an increasingly large percentage of the space disposed radially inwardly of said connector surface area as said flow control member approaches the closed position during movement of said flow control member from the open position to the closed position to force fluid from the space disposed radially inwardly of said connector surface area and cushion engagement of said flow control member with said valve seat.

23. A valve assembly operable to block fluid flows in excess of a predetermined fluid flow, said valve assembly comprising a housing for conducting fluid flows, said housing including an inner side surface means for at least partially defining a fluid flow path through said housing, said inner side surface means including a first converging surface area having a relatively large diameter at an upstream end of said first converging surface area and a relatively small diameter at a downstream end of said first converging surface area, a second converging surface area disposed downstream of said first converging surface area and having a relatively large diameter at an upstream end of said second converging surface area and a relatively small diameter at a downstream end of said second converging surface area, and a connector surface area which extends downstream from the relatively small diameter end of said first converging surface area toward the relatively large diameter end of said second converging surface area, a flow control member disposed in said housing and movable between an open position and a closed position in which said flow control member engages said inner side surface means to block fluid flow through said housing, said flow control member including a first portion which cooperates with said first converging surface area to form a first variable size orifice, said first portion of said flow control member being movable along said first converging surface area during at least a major portion of the movement of said flow control member from the open position to the closed posiion to continuously decrease the size of the first orifice during at least a major portion of the movement of said flow control member from the open position to the closed position, said flow control member further including a second portion which cooperates with said second converging surface area to form a second variable size orifice, said second portion of said flow control member being movable along said second converging surface area during at least a major portion of the movement of said flow control member from the open position to the closed position to continuously decrease the size of the second orifice during at least a major portion of the movement of said flow control member from the open position to the closed position, said flow control member including means for occupying an increasingly larger percentage of the space disposed inwardly of said connector surface as said flow control member approaches the closed position to displace fluid from the space between said first and second orifices and reduce the force with which said flow control member engages said inner side surface means upon movement of said flow control member to the closed position.

24. A valve assembly as set forth in claim 23 further including spring means for urging said flow control member toward the open position, said flow control member being urged from the open position toward the closed position against the influence of said spring means with a fluid pressure force which is a function of the magnitude of the pressure drops across said first and second orifices during fluid flow through said housing with said flow control member in the open position.

25. A valve assembly as set forth in claim 24 wherein said first portion of said flow control member includes a circular rim with first and second side surfaces which intersect to form a first sharp edge which is disposed radially inwardly of said first converging surface area during at least a major portion of the movement of said flow control member from the open position to the closed position, said first and second side surfaces extending transversely to said first converging surface area to form a fluid flow passage which contracts in a downstream direction to the first sharp edge and expands in a downstream direction away from the first sharp edge so that the pressure drop across said first orifice is substantially independent of fluid viscosity, said second portion of said flow control member including third and fourth side surfaces which intersect to form a second sharp edge which is disposed radially inwardly of said second converging surface area during at least a major portion of the movement of said flow control member from the open position to the closed position, said third and fourth side surfaces extending transversely to said second converging surface area to form a fluid flow passage which contracts in a downstream direction to the second sharp edge and expands in a downstream direction away from the second sharp edge so that the pressure drop across the second orifice is substantially independent of fluid viscosity.

26. A valve assembly as set forth in claim 25 further including pressure peak limiting means operable under the influence of a transient pressure surge upon movement of said flow control member to the closed position to connect a portion of said housing upstream of said flow control member in fluid communication with a portion of said housing downstream of said flow control member.

27. A valve assembly operable to block fluid flow in excess of a predetermined fluid flow, said valve assembly comprising a housing for conducting fluid, said housing including an inner side surface which includes a first converging surface area, said first converging surface area having a relatively large diameter at an upstream end of said first converging surface area and a relatively small diameter at a downstream end of said first converging surface area, said housing further including a valve seat disposed downstream of said first converging surface area, said valve seat including a second converging surface area, said second converging surface area having a relatively large diameter at an upstream end of said second converging surface area and a relatively small diameter at a downstream end of said second converging surface area, a flow control member disposed in said housing and movable between a open position and a closed position in which said flow control member engages at least a portion of said valve seat to block fluid flow through said housing, said flow control member including a first portion which is disposed radially inwardly of said first converging surface area during at least a major portion of the movement of said flow control member from the open position to the closed position to form a first variable size orifice between said first converging surface area and said first portion of said flow control member, said flow control member further including a second portion which cooperates with said second converging surface area to form a second variable size orifice, said second portion of said flow control member being disposed radially inwardly of said second converging surface area during at least a major portion of the movement of said flow control member from the open position to the closed position, said valve assembly further including spring means for urging said flow control member toward the open position, and pressure peak limiting means operable under the influence of a transient pressure surge upon movement of said flow control member to the closed position to connect a portion of said housing upstream of said valve seat in fluid communication with a portion of said housing downstream of said valve seat.

28. A valve assembly as set forth in claim 27 wherein said pressure peak limiting means include surface means for forming a passage extending through said flow control member, and a valve member disposed in said passage and movable between an open position and a closed position blocking fluid flow through said passage.

29. A valve assembly as set forth in claim 27 wherein said first portion of said flow control member includes a circular rim with first and second side surfaces which intersect to form a first sharp edge which is disposed radially inwardly of said first converging surface area during at least a major portion of the movement of said flow control member from the open position to the closed position, said first and second side surfaces extending transversely so said first converging surface area to form a fluid flow passage which contracts in a downstream direction to the first sharp edge and expands in a downstream direction away from the first sharp edge so that the pressure drop across said first orifice is substantially independent of fluid viscosity.

30. A valve assembly operable to block fluid flows in excess of a predetermined fluid flow, said valve assembly comprising a housing for conducting fluid flow, said housing including a first surface area and a second surface area downstream of said first surface area, said first surface area having a circular cross sectional configuration throughout its axial extent and converging radially inwardly from a relatively large diameter end portion to a relatively small diameter end portion disposed downstream of the relatively large diameter end portion, a flow control member disposed in said housing and movable between an open position and a closed position blocking fluid flow through said housing, spring means for applying force to said flow control member to urge said flow control member toward the open position, said flow control member having a first portion which cooperates with said first surface area to form a first orifice across which there is a first fluid pressure drop during fluid flow through said housing with said flow control member in the open position, said first orifice decreasing in size as said flow control member moves from the open position toward the closed position to increase the magnitude of the first pressure drop and the magnitude of the fluid pressure force urging said flow control member toward the closed position, said first portion of said flow control member being disposed adjacent to the relatively large diameter end portion of said first surface area when said flow control member is in the open position and being disposed adjacent to the relatively small diameter end portion of said first surface area when said flow control member is in the closed position, said first portion of said flow control member being disposed radially inwardly of said first surface area during at least a large majority of the movement of said flow control member from the open position to the closed position, said flow control member having a second portion which is disposed downstream of said first portion and which cooperates with said second surface area to form a second orifice across which there is a second fluid pressure drop during fluid flow through said housing with said flow control member in the open position, said flow control member being urged from the open position toward the closed position against the spring force with a fluid pressure force which is a function of the magnitude of the first and second fluid pressure drops during fluid flow through said housing with said flow control member in the open position.

31. A valve assembly as set forth in claim 30 wherein said first portion of said flow control member includes a sharp edge which cooperates with said first surface area to form said first orifice and to make the first pressure drop across said first orifice substantially independent of the viscosity of the fluid.

32. A valve assembly as set forth in claim 30 wherein said second surface area has a circular cross sectional configuration throughout its axial extent and converges radially inwardly from a relatively large diameter end portion to a relatively small diameter end portion disposed downstream of the relatively large diameter end portion, said second orifice decreasing in size as said flow control member moves from the open position toward the closed position to increase the magnitude of the second pressure drop and the magnitude of the fluid pressure force urging said flow control member toward the closed position.

33. A valve assembly operable to block fluid flows in excess of a predetermined fluid flow, said valve assembly comprising a housing for conducting fluid flow, said housing including a first surface area and a second surface area downstream of said first surface area, said first surface area having a circular cross sectional configuration throughout its axial extent and converging radially inwardly from a relatively large diameter end portion to a relatively small diameter end portion disposed downstream of the relatively large diameter end portion, said second surface area having a circular cross sectional configuration throughout its axial extent and converging radially inwardly from a relatively large diameter end portion to a relatively small diameter end portion disposed downstream of the relatively large diameter end portion, a flow control member disposed in said housing and movable between an open position and a closed position blocking fluid flow through said housing, spring means for applying force to said flow control member to urge said flow control member toward the open position, said flow control member having a first portion which cooperates with said first surface area to form a first orifice across which there is a first fluid pressure drop during fluid flow through said housing with said flow control member in the open position, said first portion of said flow control member being disposed adjacent to the relatively large diameter end portion of said first surface area when said flow conrol member is in the open position and being disposed adjacent to the relatively small diameter end portion of said first surface area when said flow control member is in the closed position, said first orifice decreasing in size as said flow control member moves from the open position toward the closed position to increase the magnitude of the first pressure drop and the magnitude of the fluid pressure force urging said flow control member toward the closed position, said flow control member having a second portion which is disposed downstream of said first portion and which cooperates with said second surface area to form a second orifice across which there is a second fluid pressure drop during fluid flow through said housing with said flow control member in the open position, said second portion of said flow control member being disposed adjacent to the relatively large diameter end portion of said second surface area when said flow control member is in the open position and being disposed adjacent to the relatively small diameter end portion of said second surface area when said flow control member is in the closed position, said second orifice decreasing in size as said flow control member moves from the open position toward the closed position to increase the magnitude of the second pressure drop and the magnitude of the fluid pressure force urging said flow control member toward the closed position, said first and second portions of said flow control member being disposed radially inwardly of said first and second surface areas, respectively, during at least a large majority of the movement of said flow control member from the open position to the closed position, said flow control member being urged from the open position toward the closed position against the spring force with a fluid pressure force which is a function of the magnitude of the first and second fluid pressure drops during fluid flow through said housing with said flow control member in the open position.

34. A valve assembly as set forth in claim 33 wherein said first portion of said flow control member includes a first sharp edge which cooprates with said first surface area to form said first orifice and to make the first pressure drop across said first orifice substantially independent of the viscosity of the fluid, said second portion of said flow control member including a second sharp edge which cooperates with said second surface area to form said second orifice and to make the second pressure drop across said second orifice substantially independent of the viscosity of the fluid.

35. A valve assembly as set forth in claim 33 wherein said housing includes an intermediate surface area disposed between said first and second surface areas, said flow control member including surface means disposed between said first and second portions of said flow control member for cooperating with said intermediate surface area to induce a backflow of fluid through said first orifice shortly before said flow control member reaches the closed position to decrease the speed of movement of said flow control member.

36. A valve assembly as set forth in claim 33 wherein the fluid pressure force applied to said flow control member is effective to accelerate said flow control member as it moves from the open position through an initial portion of its operating stroke to the closed position, said valve assembly further including means for decelerating said flow control member as said flow control member moves through a final portion of its operating stroke to reduce the velocity of said flow control member before it reaches its closed position.

37. A valve assembly as set forth in claim 33 wherein the fluid pressure force applied to said flow control member is effective to accelerate said flow control member as it moves from the open condition through an initial portion of its stroke to the closed position, said valve assembly further including means for reversing at least a portion of the fluid pressure force applied to said flow control member as said valve member moves through a final portion of its operating stroke to decelerate said flow control member before it reaches its closed position.

38. A valve assembly as set forth in claim 33 further including pressure peak limiting means extending between a location upstream of said first orifice and downstream of said second orifice for limiting the fluid pressure upstream of said first orifice.

39. A valve assembly as set forth in claim 33 further including bypass means operable between a closed condition and an open condition connecting a portion of said housing upstream of said first surface area in fluid communication with a portion of said housing downstream of said second surface area.

40. A valve assembly as set forth in claim 33 wherein said housing includes means for forming a valve seat adjacent to the large diameter end portion of said second surface area, said flow control member including surface means disposed between said first and second portions of said flow control member for engaging said valve seat when said flow control member is in the closed position.

41. A valve assembly as set forth in claim 33 wherein said first portion of said flow control member includes first and second side surfaces which intersect at a circular rim which is disposed radially inwardly of said first surface area during at least a large majority of the movement of said flow control member from the open position to the closed position, said first side surface facing in an upstream direction and said second side surface facing in a downstream direction, said first and second side surfaces extending transversely to said first surface area to form a fluid flow passage which contracts in a downstream direction to the circular rim and expands in a downstream direction away from the circular rim.

42. A valve assembly as set forth in claim 41 wherein said second portion of said flow control member includes third and fourth side surfaces which intersect at a second circular rim which is disposed radially inwardly of said second surface are during at least a large majority of the movement of said flow control member from the open position to the closed position, said third and fourth surfaces extending transversely to said second surface area to form a fluid flow passage which contracts in a downstream direction to the second circular rim and expands in a downstream direction away from the second circular rim.

43. A valve assembly operable to block fluid flows in excess of a predetermined fluid flow, said valve assembly comprising a housing for conducting fluid flow, said housing including a first surface area and a second surface area downstream of said first surface area, said first surface area having a circular cross sectional configuration throughout its axial extent and converging radially inwardly from a relatively large diameter end portion to a relatively small diameter end portion disposed downstream of the relatively large diameter end portion, said second surface area having a circular cross sectional configuration throughout its axial extent and converging radially inwardly from a relatively large diameter end portion to a relatively small diameter end portion disposed downstream of the relatively large diameter end portion, said housing including means for forming a valve seat adjacent to the large diameter end portion of said second surface area, a flow control member disposed in said housing and movable between an open position and a closed position blocking fluid flow through said housing, spring means for applying force to said flow control member to urge said flow control member toward the open position, said flow control member having a first portion which cooperates with said first surface area to form a first orifice across which there is a first fluid pressure drop during fluid flow through said housing with said flow control member in the open position, said flow control member including surface means disposed between said first and second portions of said flow control member for engaging said valve seat when said flow control member is in the closed position, said first orifice decreasing in size as said flow control member moves from the open position toward the closed position to increase the magnitude of the first pressure drop and the magnitude of the fluid pressure force urging said flow control member toward the closed position, said flow control member having a second portion which is disposed downstream of said first portion and which cooperates with said second surface area to form a second orifice across which there is a second fluid pressure drop during fluid flow through said housing with said flow control member in the open position, said second orifice decreasing in size as said flow control member moves from the open position toward the closed position to increase the magnitude of the second pressure drop and the magnitude of the fluid pressure force urging said flow control member toward the closed position, said flow control member being urged from the open position toward the closed position adjust the spring force with a fluid pressure force which is a function of the magnitude of the first and second fluid pressure drops during fluid flow through said housing with said flow control member in the open position.

44. A valve assembly as set forth in claim 43 wherein the fluid pressure force applied to said flow control member is effective to accelerate said flow control member as it moves from the open position through an initial portion of its operating stroke to the closed position, said valve assembly further including means for decelerating said flow control member as said flow control member moves through a final portion of its operating stroke to reduce the velocity of said flow control member before it reaches its closed position.

45. A valve assembly as set forth in claim 43 wherein the fluid pressure force applied to said flow control member is effective to accelerate said flow control member as it moves from the open condition through an initial portion of its stroke to the closed position, said valve assembly further including means for reversing at least a portion of the fluid pressure force applied to said flow control member as said valve member moves through a final portion of its operating stroke to decelerate said flow control member before it reaches its closed position.

46. A valve assembly as set forth in claim 43 further including pressure peak limiting means extending between a location upstream of said first orifice and downstream of said second orifice for limiting the fluid pressure upstream of said first orifice.

47. A valve assembly as set forth in claim 43 further including bypass means operable between a closed condition and an open condition connecting a portion of said housing upstream of said first surface area in fluid communication with a portion of said housing downstream of said second surface area.

48. A valve assembly as set forth in claim 43 wherein said first and second portions of said flow control member have sharp circular edges which cooperate with said first and second surface areas to make the first and second pressure drops across the first and second orifices substantially independent of the viscosity of the fluid.

* * * * *